United States Patent [19] [11] 4,128,020
Gray [45] Dec. 5, 1978

[54] ENERGY STORAGE AND TRANSMISSION APPARATUS

[76] Inventor: Archie B. Gray, 4521 San Pedro Sq., Orlando, Fla. 32807

[21] Appl. No.: 675,994

[22] Filed: Apr. 12, 1976

[51] Int. Cl.[2] .......................... F16F 15/30; H02K 7/06; H02K 21/22; H02K 33/00

[52] U.S. Cl. .......................................... 74/572; 310/24; 310/153

[58] Field of Search ............. 74/572, DIG. 9; 310/24, 310/37, 153, 105; 123/185

[56] References Cited

U.S. PATENT DOCUMENTS

| | | | |
|---|---|---|---|
| 757,636 | 6/1903 | Reichenbach | 310/153 X |
| 1,703,991 | 7/1926 | Day | 74/572 |
| 3,688,136 | 8/1972 | Salverda | 310/37 X |
| 3,703,653 | 11/1972 | Tracy et al. | 310/24 |
| 3,811,058 | 5/1974 | Kiniski | 310/24 X |
| 3,879,622 | 4/1975 | Ecklin | 310/24 X |
| 3,967,146 | 6/1976 | Howard | 310/24 X |

*Primary Examiner*—Samuel Scott
*Assistant Examiner*—Don E. Ferrell
*Attorney, Agent, or Firm*—Duckworth, Hobby & Allen

[57] ABSTRACT

An apparatus for storing and transmitting mechanical energy which utilizes a flywheel having a plurality of flywheel magnets located about the periphery thereof. An actuator is disengagably coupled to the flywheel for supplying rotary kinetic energy thereto. A plurality of coacting magnets are spaced about the circumference of the flywheel for interacting with the flywheel magnets. A linkage system is provided between the coacting magnets and the flywheel magnets for moving the coacting magnets in a timed relation with the flywheel magnets for imparting further rotation to the flywheel. A power take off is also coupled to the flywheel for removing kinetic energy stored therein.

12 Claims, 2 Drawing Figures

10
101
110
71
61
91
60
84
102
110
62
92
72
85
80
24
82
60
87
86
64
94
74
104
110
28
63
93
73
103
110

ENERGY STORAGE AND TRANSMISSION APPARATUS

BACKGROUND OF THE INVENTION

1. Field of the Invention

This invention relates to mechanical means for storing energy and in particular to magnetically augmented flywheels coupled to an internal combustion engine for storing a portion of the power output thereof.

2. Description of the Prior Art

As conventional sources of energy, such as petroleum, natural gas, etc., become more expensive, it becomes more economical to develop new methods and machines for conserving energy which was heretofore wasted. It also becomes more economically feasible to design methods and machines to operate under optimum conditions for maximizing the conversion ratio of mechanical energy produced to the quantity of fuel consumed. Other considerations such as the reduction of hydrocarbon pollutants and noise also influence the designers' decisions as to the design approach to energy conversion machines.

The automobile is an excellent example of the changing priorities in the design of energy storage and conversion machines. When petroleum products were inexpensive, it was more expedient to provide the large internal combustion engines required to meet the peak power demands of the automobile, since fuel economy was not an important consideration. However, it is now good design procedure to minimize the weight of the internal combustion engine and maximize the energy conversion ratio. One method of accomplishing this objective is to utilize a smaller engine which can run at a relatively constant speed, and coupling to this engine an energy storage device such as a flywheel. During the periods of peak energy demand, the energy stored in the flywheel and the energy supplied by the internal combustion engine can both be utilized for powering the vehicle. In periods of slack demand, the engine can replenish the kinetic energy stored within the flywheel to prepare the system for future peak energy demands.

The present invention relates to a novel apparatus for increasing the energy stored within the flywheel or, in the alternative, reducing the rotational speed of the flywheel while maintaining the same energy storage capacity. This energy is obtained from an internal combustion engine through a clutch, with the power from the internal combustion engine also being instantaneously available to supply immediate power requirements. Both the output of the internal combustion engine and the energy stored within the flywheel are harnessed for driving an electrical generator. The power output of the electrical generator can then be controlled to respond to the power required by the electrical loads, such as motors, etc.

Other related inventions are disclosed by Reinbeck in U.S. Pat. No. 3,888,325; Kinzel in U.S. Pat. No. 3,884,317; Dudley et al. in U.S. Pat. No. 3,508,256; Mager in U.S. Pat. No. 3,792,742; and Haydon in U.S. Pat. No. 3,909,646.

SUMMARY OF THE INVENTION

This invention relates to an energy storage and transmission apparatus having a flywheel for storing kinetic energy in the rotational movement thereof, with the flywheel having flywheel magnets attached thereto. A disengagable flywheel actuating means is coupled to the flywheel for supplying rotary kinetic energy thereto. Coacting magnet means are spaced from the flywheel for coacting with the flywheel magnets. Linkage means are coupled between the coacting magnet means and the flywheel for moving the coacting magnet means in a timed relation with the flywheel magnets for imparting further rotational energy to the flywheel. Power take off means are coupled to the flywheel for removing kinetic energy therefrom.

THE DRAWINGS

Other objects, features and advantages of this invention will be evident from a study of the detailed description and the drawings in which.

DETAILED DESCRIPTION OF THE PREFERRED EMBODIMENT

Figure 1:
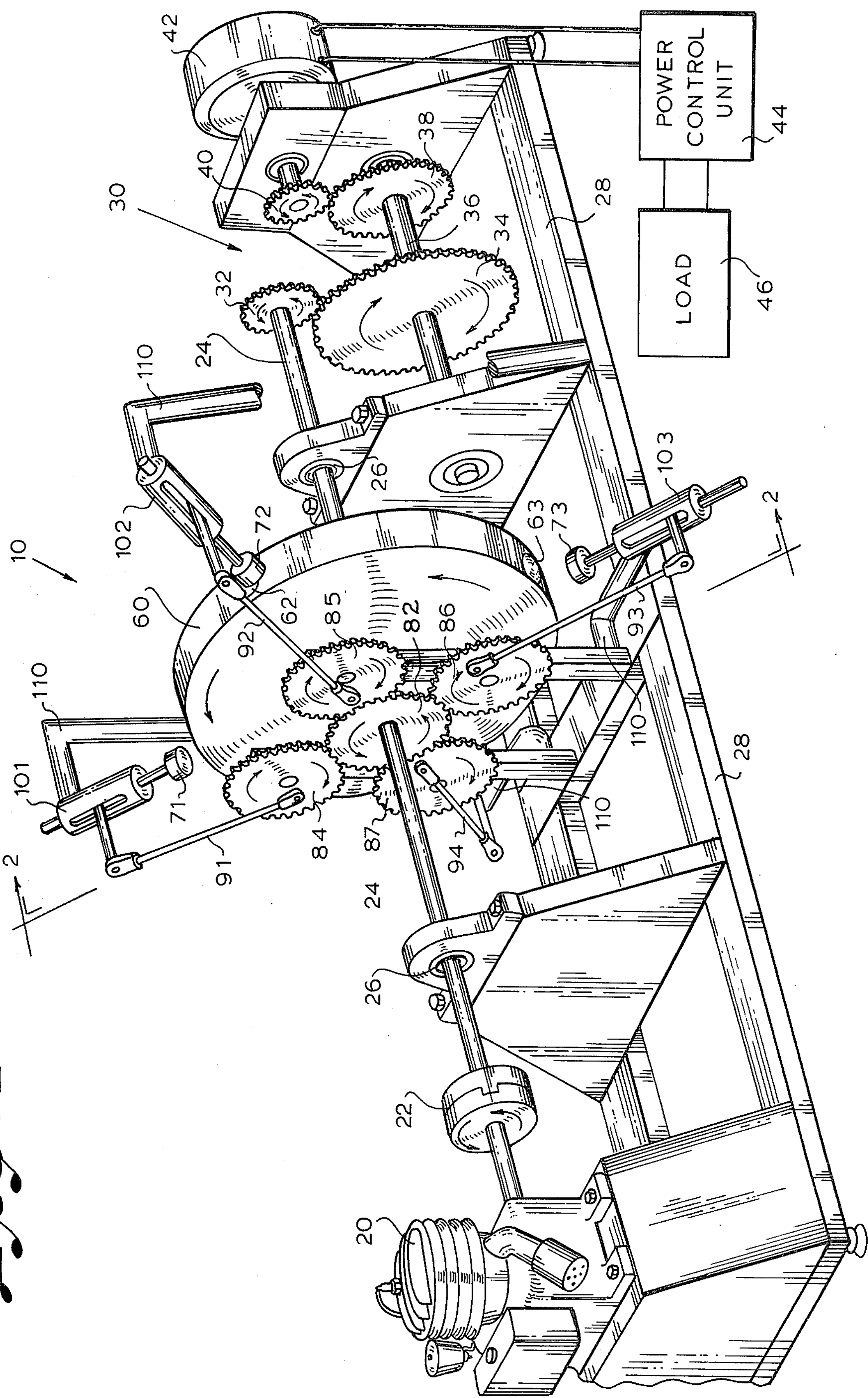
FIG. 1 is a frontal perspective view of a first preferred embodiment of the energy storage and transmission apparatus.

A first preferred embodiment of the energy storage and transmission apparatus in accordance with the present invention is shown generally as 10 in FIG. 1. An internal combustion engine 20, or disengagable flywheel actuating means, is coupled by a disengagable clutch 22 to a main rotary shaft 24. The clutch 22 may be remotely disengaged or may be automatically actuated in response to an increase or decrease in the load applied to the shaft. The main shaft 24 is rotatably coupled through two low friction main bearings 26, which are in turn coupled to a main frame 28. A speed reduction transmission 30 is coupled to the opposite end of the main shaft 24. The transmission 30 comprises a first transmission gear 32 for driving a second transmission gear 34. The second transmission gear 34 is coupled to a transmission shaft 36 which also has coupled thereto a third transmission gear 38. The third transmission gear 38 engages a fourth transmission gear 40 which is engaged to the drive shaft of an electrical generator or alternator means 42.

The power output from the main shaft 24 is coupled through the transmission 30 to the electrical generator 42 for producing electrical energy which is then supplied through a power control unit 44 to an electrical load 46. While the electrical generator 42 has been illustrated as one example of a power take off means coupled to the main power shaft 24, it will be obvious to one skilled in the art that various forms of power driven devices may be coupled to either the main shaft 24 or the transmission 30 in place of the electrical generator 42.

Figure 2:
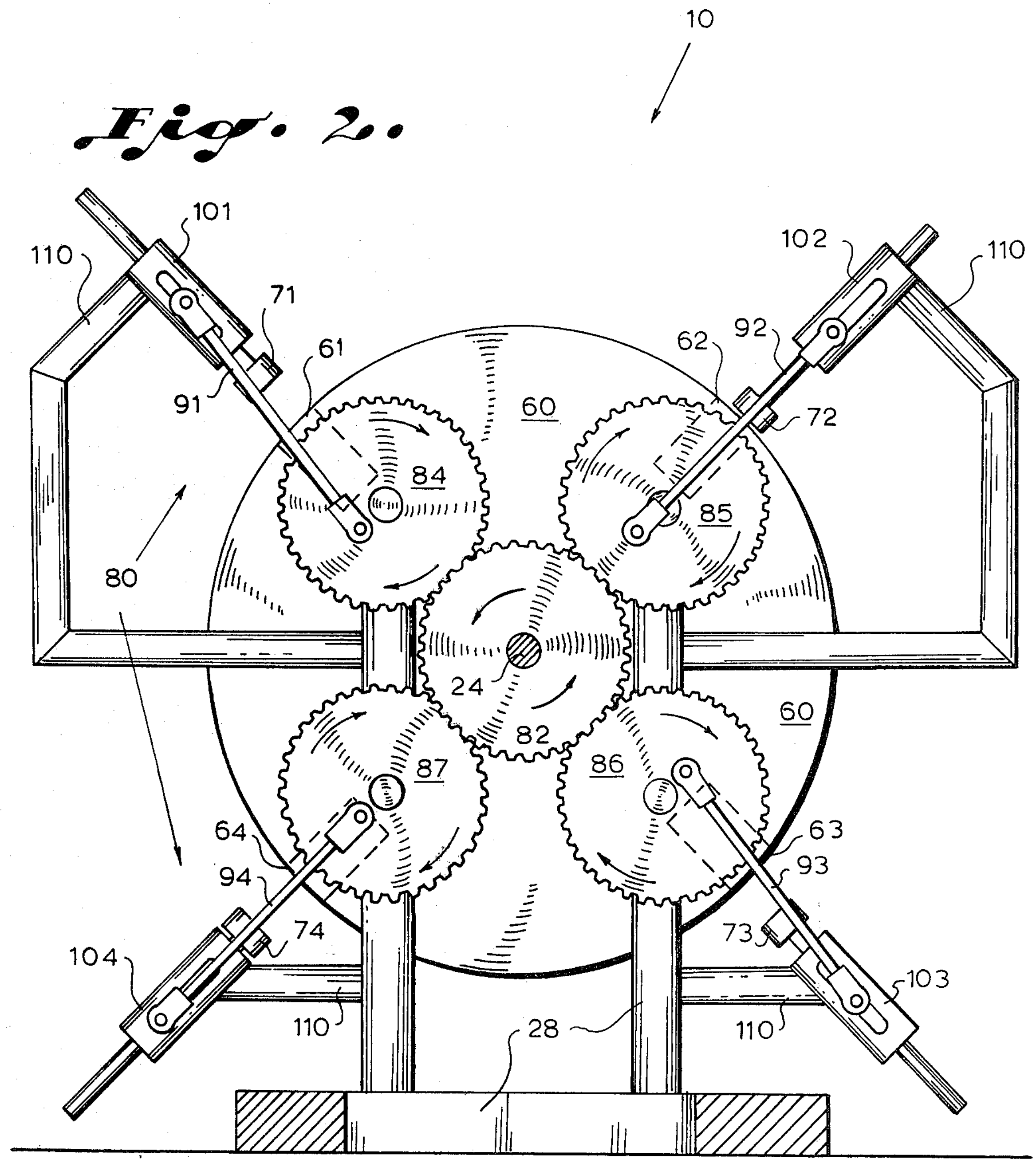
FIG. 2 is a cross-sectional view of the flywheel elements as viewed along section lines 2—2 in FIG. 1.

As shown in FIGS. 1 and 2, a circular or disc-shaped flywheel is coaxially coupled to the main shaft 24 for rotation thereabout. The flywheel 60 includes four permanent magnets 61, 62, 63 and 64 located adjacent to the circumferential or peripheral surface of the flywheel. While only four flywheel magnets are illustrated in the first preferred embodiment of the present invention, it should be obvious to one skilled in the art that more flywheel magnets can be utilized. Since the flywheel is constructed of an aluminum or other high strength, non-magnetic material, the lines of magnetic flux emanating from the permanent magnets 61–64 will not be disturbed by the presence of the flywheel.

Four coacting peripheral magnets 71, 72, 73 and 74 are circumferentially spaced about the circumferential surface of the flywheel 60. The peripheral magnets 71–74 define a plane which also contains the flywheel magnets 61–64. As the flywheel 60 rotates about the main shaft 24, the peripheral magnets 71–74 will reciprocate in proximity to the circumferential surface of the flywheel 60. This reciprocating action of the peripheral magnets 71–74 will be in a timed relation with the passage of the flywheel magnets 61–64 for imparting further rotation to the flywheel 60. In a first preferred embodiment of the present invention the peripheral magnets 71–74 are of the same polarity as the flywheel magnets 61–64, thus generating a repelling force therebetween.

Linkage means, shown generally as 80 in FIGS. 1 and 2, are provided for regulating the motion of the peripheral coacting magnets 71–74 such that their point of closest approach to the flywheel magnets 61–64 occurs at a time immediately subsequent to the rotational passage of the flywheel magnet thereunder. In this manner the repulsion force between the two coacting magnets will cause additional rotational energy to be imparted to the flywheel to increase the rotational kinetic energy thereof. Of course, by utilizing opposite poles of cooperating magnets, and by regulating the point of closest approach of the peripheral magnets to the flywheel to occur immediately prior to the passage of the flywheel magnet beneath the peripheral magnet, a substantially similar increase in the kinetic energy of the flywheel may be realized.

The linkage means 80 in the first embodiment of the present invention comprises a primary gear 82 coupled to the main shaft 24 for rotating in a fixed relationship with the flywheel 60. Four secondary gears 84, 85, 86 and 87 are equally spaced about the main shaft 24 for being coupled to and driven by the rotation of the primary gear 82. Each of the secondary gears 84–87 rotates on a low friction bearing about an axis of rotation parallel to the main shaft 24. The four secondary gears 84–87 and the primary gear 82 lie in generally the same plane which is also parallel with the plane of the flywheel 60.

Each one of the secondary gears 84–87 includes a linkage arm 90 coupled eccentrically thereto by a low friction coupler bearing, thereby transforming the rotational energy of the secondary gear into a longitudinal or linear reciprocating motion of one end of the linkage arm. Each of the linkage arms 91–94 includes a U-shaped bend adjacent the second end thereof. The coacting peripheral magnets 71–74 are coupled to the distended end of the respective linkage arms 91–94. The linear reciprocal motion of the peripheral magnets 71–74 is guided by one end of the linkage arm 91 communicating through a corresponding low friction linkage guide 101, 102, 103, and 104. These linkage guides 101–104 are coupled to the main frame 28 through various support arms 110 coupled therebetween. The throw of each of the coacting or peripheral magnets 71–74 is regulated such that the magnet comes in close proximity to the circumferential surface of the flywheel 60 without actually communicating therewith. The timing of this point of closest approach between the peripheral magnets 71–74 and the flywheel magnets 61–64 is determined by the effective circumferential length of the secondary gears 84–87 and the primary gear 82. An optimum phase differential between the point of closest approach of the peripheral magnets 71–74 to the flywheel magnets 61–64 is considered to be approximately 2° to 3°. The ratio of the periodic motion of the peripheral magnets 71–74 to the flywheel magnets 61–64 is a design variable which should be optimized for the requirements dictated by the specific application.

The operation of the energy storage and transmission apparatus 10 will now be generally described with reference to FIG. 1. First, the internal combustion engine 20 is started and the rotational energy produced thereby is coupled through the clutch 22 to produce a rotation of the main shaft 24 and the flywheel 60. It is envisioned that the flywheel 60 will rotate at approximately 1500 to 2500 RPM. The rotational kinetic energy produced by the rotation of the flywheel 60 will of course have been supplied by the internal combustion engine 20. The rotation of the main shaft 24 will also be transmitted through the transmission 30 to drive the electrical generator 42. The electrical power produced by the electrical generator 42 will be transferred through the power control unit 44 to the load 46. Once the flywheel 60 reaches the predetermined rotational speed, the internal combustion engine 20 may be disengaged from the rotating shaft 24 by operation of the clutch 22 if no power is being drawn from the main shaft 24. However, it is envisioned that the internal combustion engine 20 will continue to supply energy to the flywheel 60 so that when time varying loads are placed upon the system, both the kinetic energy of the rotating flywheel 60 and the energy produced by the internal combustion engine 20 will be available for supplying the required power.

As the flywheel 60 continues to rotate, the linkage means 80 will continue to reciprocate the peripheral magnets 71–74 into close proximity to the flywheel magnets 61–64. The combined effect of the angular momentum of the linkage means 80 and the repelling effect between the like poles of the peripheral magnets 71–74 and the flywheel magnets 61–64 will provide an additional storage reservoir of kinetic rotational energy. As a peak load is placed on the electrical generator 42 the rotational speed of the main shaft 24 will be decreased. The angular momentum of the flywheel 60 and the kinetic energy and potential energy stored by the operation of the linkage means 80 in driving the coacting peripheral magnets 71–74 with respect to the rotating flywheel magnets 81–84 will resist the change in rotational speed of the main shaft 24. As the rotational speed of the flywheel 60 is decreased, a reduction in kinetic energy within the flywheel 60, the coacting magnets 71–74 and the linkage means 80 will be transformed into electrical energy produced by the electrical generator 42. When the peak load placed upon the electrical generator 42 is removed, or at least reduced, the power output of the internal combustion engine 20 may be utilized to replenish the decrease in kinetic energy of the flywheel 60, the linkage means 80, and the coacting magnets 71–74.

In this manner, a smaller internal combustion engine 20 having a reduced power output may be utilized in conditions requiring high peak power output, since the energy stored within the rotating flywheel 60, the linkage means 80 and the coacting magnets 71–74 will be available for satisfying peak load requirements.

While the first preferred embodiment of the present invention may be utilized to store and transmit energy, this invention is also capable of being utilized as an educational toy for illustrating the concepts of: (1) the storage of kinetic energy in the form of the rotation of a flywheel; and (2) the interaction of magnetic fields for increasing the storage capacity of kinetic energy within the rotating flywheel 60. The present invention may also be used as a children's toy or a device for amusing adults.

The preferred embodiment of the energy storage and transmission apparatus has been described as an example of the invention as claimed. However, the present invention should not be limited in its application to the details illustrated in the accompanying drawings and the specification, since this invention may be practiced or constructed in a variety of different embodiments. Also, it must be understood that the terminology and descriptions employed herein are used solely for the purpose of describing the general process of the preferred embodiment, and therefore should not be construed as limitations on the operability of the invention.

I claim:

1. An energy storage and transmission apparatus comprising in combination:

a flywheel for storing kinetic energy in the rotational movement thereof, said flywheel having flywheel magnets attached thereto, said flywheel magnets being equidistantly spaced about a circumferential surface of said flywheel;

disengagable flywheel actuating means coupled to said flywheel for supplying rotary kinetic energy thereto;

coacting magnet means spaced from said flywheel for coacting with said flywheel magnets, said coacting magnet means comprising a plurality of peripheral magnets circumferentially spaced about said circumferential surface of said flywheel;

linkage means coupled between said coacting magnet means and said flywheel for moving said coacting magnet means in a timed relation with said flywheel magnets for imparting further rotation to said flywheel;

said linkage means further comprising eccentric means coupled between said flywheel and said peripheral magnets for transforming the rotational motion of said flywheel into linear motion of said peripheral magnets and said linear motion of said peripheral magnets being directed radially towards a center of rotation of said flywheel; and power take off means coupled to said flywheel for removing kinetic energy therefrom.

2. The apparatus as described in claim 1 wherein said disengagable flywheel actuating means comprises an internal combustion engine.

3. The apparatus as described in claim 2 wherein said disengagable flywheel actuating means further comprises a disengagable clutch coupled between said internal combustion engine and said flywheel.

4. The apparatus as described in claim 1 wherein said power take off means comprises electrical generating means for supplying electrical power to a load.

5. The apparatus as described in claim 1 wherein said linear motion of said peripheral magnets defines a first plane, with said first plane also containing therein said flywheel magnets.

6. The apparatus as described in claim 5 wherein said linkage means and said eccentric means comprise:

a primary gear coupled to said flywheel for rotating in a fixed relationship therewith;

a plurality of secondary gears coupled to said primary gear for rotating in a fixed relationship therewith;

a plurality of linkage arms each having coupled at one end thereof one of said peripheral magnets and having another end thereof eccentrically coupled to one of said second gears for transforming the rotational motion thereof into a reciprocating motion of said peripheral magnet.

7. The apparatus as described in claim 6 wherein said linkage means further comprises a plurality of linkage guides each coupled to one of said linkage arms adjacent said peripheral magnet for guiding said reciprocating motion thereof.

8. The apparatus as described in claim 7 wherein said linkage arms include a U-shaped bend between said linkage guide and said another end thereof.

9. The apparatus as described in claim 6 wherein said reciprocating motion imparted to each of said peripheral magnets is regulated by said primary gear, said secondary gear and said linkage arm to have a closest approach of said peripheral magnet to said flywheel immediately subsequent to the rotational passage of one of said flywheel magnets thereby.

10. The apparatus as described in claim 9 wherein said reciprocating motion of said peripheral magnets is regulated by said primary gear, said secondary gear and said linkage arm for having said periphery magnets sequentially approach said flywheel magnets, thereby supplying a series of rotational thrusts to said flywheel.

11. The apparatus as described in claim 7 wherein an axis of rotation of said primary gear and an axis of rotation of said secondary gears are parallel to an axis of rotation of said flywheel.

12. The apparatus as described in claim 11 wherein each of said peripheral magnets are of the same magnetic polarity as said flywheel magnets, thereby producing a repelling force therebetween.

* * * * *